United States Patent Office 3,697,425
Patented Oct. 10, 1972

3,697,425
BEARINGS COMPRISING POLYOLEFINS AND AN IMINE MODIFIED CARBON BLACK COMPOUND
Paul Lagally, Annapolis, Md., assignor to the United States of America as represented by the Secretary of the Navy
No Drawing. Original application Oct. 29, 1969, Ser. No. 872,382. Divided and this application Jan. 14, 1971, Ser. No. 106,530
Int. Cl. C10m 7/02
U.S. Cl. 252—12
3 Claims

ABSTRACT OF THE DISCLOSURE

A cyclic imine and carbon black compound is provided which can be used as a reinforcing agent for a polyolefin material.

This is a division of application Ser. No. 872,382, filed Oct. 29, 1969, now U.S. Pat. 3,623,899.

The invention described herein may be manufactured and used by or for the Government of the United States of America for governmental purposes without the payment of any royalties thereon or therefor.

SUMMARY OF THE INVENTION

The present invention relates to enhancing the overall sliding qualities and improving the structural properties in a polyolefin structure, such as high density polyethylene, by adding to said structure a cyclic imine modified carbon black compound. Although the use of carbon black as a reinforcing additive for elastomeric and plastic materials is well known, recent advances in the technology of polyalkenes reveal new improvements in the field of structural composites. Polyethylene is a low friction material but it has a low elastic modulus and is basically non-reactive. Consequently, polyethylene cannot bear high loads without showing signs of "creep" and its inert nature makes modifications difficult. These properties detract from the otherwise excellent sliding behavior of polyethylene. The addition of carbon black to polyethylene increases the elastic modulus required for sustaining high loads and furthermore has the effect of producing a more reactive polymeric structure. Additionally, carbon black imparts to the composite certain functional groups which cannot be furnished by the polyethylene alone but are required when said composite is used in a bearing-journal arrangement to control the solid and fluid lubrication characteristics in the rubbing interface.

Although carbon black treated plastic materials are old, the addition of a cyclic imine to this composite is new. By combining the cyclic imine and carbon black compound with the polyethylene material, the flow properties of the composite are reduced because of increased cross-linking between the cyclic imine and the carbon black. Therefore the addition of said imine carbon black compound has the effect of placing the polyethylene in a cage which prevents deformation of the polyolefin material.

It is, therefore, an object of the present invention to provide a novel cyclic imine and carbon black compound.

It is another object of this invention to provide a novel reinforcing compound for increasing the elastic modulus in polyolefins.

It is still another object of this invention to provide a novel bearing which has improved structural and overall sliding properties.

Other objects and many of the attendant advantages of this invention will be readily appreciated as the same becomes better understood by reference to the following description and claims.

DESCRIPTION OF THE PREFERRED EMBODIMENT

Normally in a bearing-journal arrangement the directional forces emanating from the journal surface control the structure of the sliding interface but they cannot prevent plastic flow or melting of the bulk bearing materials. Consequently to meet extreme load supporting requirements curing mechanisms must be employed which convert the thermoplastic bearing material into a network which is dimensionally stable. Conventional crosslinking techniques through free radical routes provide an inadequate remedy because they can cause simultaneous polymer chain scission resulting in structural disorder and reduced sliding qualities. However, the addition of carbon blacks with a variety of surface reactive groups permits the control of composite structures. Highly acidic channel blacks contain, in addition to free radical sites, phenolic lactone and even carboxylic groups which can be crosslinked by suitable additives. Since ethylene imine reacts only with the carbon black, structural composites with reduced wear can be prepared which have good frictional qualities because they contain practically unmodified polyethylene entities.

Polymer chemistry teaches that ethylene imine and its derivatives polymerize instantaneously when in contact with groups containing active hydrogen, such as are present in the surface of carbon black, to form a high molecular material which may contain new functionalities. Without stating any particular theory of action, the following reaction mechanism is assumed. If R represents the phenoxy or carboxyl radicals in the carbon black surface and R' represents hydrogen, aryl or aralkyl groups containing hydrophilic or hydrophobic groups such as amine, nitrile or fluorine, the surface modification of the carbon black particles can be described as follows:

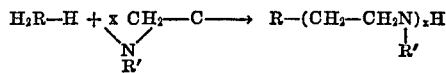

Subsequent amination can occur when excess ethylene imine or its derivative is present.

The invention will further be explained with reference to the following examples, which are set forth merely by way of illustration and not by way of limitation.

EXAMPLE I

Ethylene imine was added through a water cooled condenser to 10 g. Carbolac 1, which represents an acidic channel black. The temperature was initially 26° C. but rose to 94° C. after the first 1 cc. of ethylene imine had been added. A total of 10 cc. of ethylene imine was added in 1 cc. increments, whereby the temperature of the carbon black rose to 100° C. After drying at 65° C. for one day, the resulting compound weighed 13.7 g.

EXAMPLE II

To 10 g. Carbolac 1 was added while stirring, 10 cc. vaporized ethylene imine. No temperature increase was noted. After drying for one hour at 65° C., the sample weight was 12.5 g. and after one day of continuous drying, it was 12.11 g.

EXAMPLE III

In this experiment, the ethylene imine was added directly to the stirred Carbolac 1. Five (5) cc. ethylene imine were added in 1 cc. increments, whereby the temperature rose to 43° C. The weight of the Carbolac 1 had increased from 10 g. to 12.4 g.

The determination of the nitrogen content and pH of the modified carbon black confirm the chemical modification which have taken place as indicated in the following table:

| Sample | Nitrogen content (percent) | pH |
|---|---|---|
| Exampe II | 6.65 | 8.2 |
| Example II | 7.41 | 7.2 |
| Example III | 7.31 | 6.8 |
| Control | 0.22 | 3.8 |

EXAMPLE IV

Fifty (50) g. of high density polyethylene, Marlex 960, having a density of 0.962, a melt index of 6.0 and a mesh size of 35, were melted on a steam heated roller mill during a period of 10 minutes. To this melt was added 25 g. of an acidic channel black, Carbolac 1, and mixing was continued for another 20 minutes to achieve complete dispersion of the channel black in the polyethylene. After cooling, a felt like product was obtained, shredded in a blender and run through a colloid mill. Thirty (30) g. of this material were reacted with 24 g. of ethylene imine in the same manner as described in Example III. After compression molding, the product had a nitrogen content of 5.1%.

Turnings of the molded specimen (0.4 g.) were extracted in a Soxhlet apparatus, using toluene, (150 mls.) until a constant weight loss was reached. The residue was an insoluble gel containing 76.4% of the polyethylene originally present. A control of the same composite, which was not treated with ethylene imine, contained 50% polyethylene in a crosslinked form.

The new material represents a novel bearing material which is useful in a dry or sea water environment. In sliding contact with bronze, it has a coefficient of friction of 0.11 in the boundary region and it has reduced abrasive wear.

The data from these experiments reveals that the surface acidity of the carbon black particles has been neutralized by loading with 23% polyethylene imine, corresponding to approximately 7% basic nitrogen, and that grafting occurred to some extent. Since polyethylene imine is known to form strong adhesive bonds with polyethylene, new improved composites for bearing applications are in the offing. Further modifications are possible by using, instead of the parent ethylene imine, substituted aziridine derivatives. The following are examples of modifying imines:

N-ethyl aziridine
N-phenethyl aziridine
N-morpholinethyl aziridine
N-(2-aminoethyl) aziridine
N-(2-hydroxyethyl) aziridine
N-(2-cyanoethyl) aziridine
Triethylene melamine
Aziridinyl phosphinoxide.

It is to be understood that the preceding examples are representative and that said examples may be varied within the scope of the total specification, as understood by one skilled in the art, to produce essentially the same result.

Obviously, many modifications and variations of the present invention are possible in the light of the teachings thereof.

What is claimed is:

1. A bearing which can be used in a dry or wet environment, comprising:
a polyolefin base material treated with a cyclic imine modified carbon black compound wherein a surface modification of the carbon black particles is described as follows:

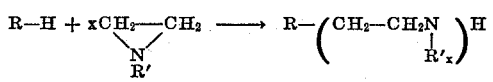

where R is selected from the group consisting of phenoxy and carboxyl radicals in the carbon black surface and R' is selected from the group consisting of hydrogen, aryl and aralkyl containing a hydrophilic or hydrophobic group selected from the group consisting of amine, nitrile and fluorine.

2. A bearing as recited in claim 1 wherein said polyolefin base material is high density polyethylene.

3. A bearing as recited in claim 2 wherein said cyclic imine is ethylene imine.

References Cited

UNITED STATES PATENTS

| 3,252,852 | 5/1966 | Lagally | 106—308 N |
| 3,425,855 | 2/1969 | Barksdale et al. | 106—300 |

ALLAN LIEBERMAN, Primary Examiner

J. H. DERRINGTON, Assistant Examiner